(12) United States Patent
Hotta et al.

(10) Patent No.: US 8,026,642 B2
(45) Date of Patent: Sep. 27, 2011

(54) DRIVING APPARATUS AND VEHICLE INCLUDING DRIVING APPARATUS

(75) Inventors: Yutaka Hotta, Chiryu (JP); Takeshi Yamazaki, Shibuya-ku (JP)

(73) Assignee: Toyota Jidosha Kabushiki Kaisha, Aichi-Ken (JP)

(*) Notice: Subject to any disclaimer, the term of this patent is extended or adjusted under 35 U.S.C. 154(b) by 124 days.

(21) Appl. No.: 12/664,279

(22) PCT Filed: Jun. 10, 2008

(86) PCT No.: PCT/JP2008/060932
§ 371 (c)(1),
(2), (4) Date: Dec. 11, 2009

(87) PCT Pub. No.: WO2008/153169
PCT Pub. Date: Dec. 18, 2008

(65) Prior Publication Data
US 2010/0194219 A1 Aug. 5, 2010

(30) Foreign Application Priority Data
Jun. 13, 2007 (JP) ................... 2007-156641

(51) Int. Cl.
H02K 9/00 (2006.01)
H02K 9/10 (2006.01)
(52) U.S. Cl. .......... 310/52; 310/54; 310/67 R; 310/68 R
(58) Field of Classification Search ............. 310/52, 310/54; 180/65.1, 65.31
See application file for complete search history.

(56) References Cited

U.S. PATENT DOCUMENTS

| 6,201,365 | B1 | 3/2001 | Hara et al. | |
|---|---|---|---|---|
| 6,323,613 | B1 | 11/2001 | Hara et al. | |
| 6,833,641 | B2 * | 12/2004 | Uchida et al. | 310/54 |
| 6,992,409 | B2 * | 1/2006 | Torii et al. | 310/52 |
| 7,009,318 | B2 * | 3/2006 | Iritani et al. | 310/58 |
| 7,030,520 | B2 * | 4/2006 | Takenaka et al. | 310/64 |
| 2005/0223727 | A1 * | 10/2005 | Funahashi et al. | 62/228.4 |

FOREIGN PATENT DOCUMENTS

| JP | 04-276172 A | | 10/1992 |
|---|---|---|---|
| JP | 2001-238406 A | | 8/2001 |
| JP | 2004-222360 A | | 8/2004 |
| JP | 2005-020881 A | | 1/2005 |
| JP | 2005-333747 A | | 12/2005 |
| JP | 2006-197781 | * | 7/2006 |
| JP | 2006-315578 A | | 11/2006 |
| JP | 2006-339229 A | | 12/2006 |
| WO | 2007/049799 A1 | | 5/2007 |

* cited by examiner

Primary Examiner — Burton Mullins
(74) Attorney, Agent, or Firm — Sughrue Mion, PLLC (57) ABSTRACT

A driving apparatus includes a rotating electrical machine; an inverter capable of supplying electric power to the rotating electrical machine; a containing case; a coolant circuit distributing coolant capable of cooling the inverter and the rotating electrical machine; a cooling mechanism, which is provided in the coolant circuit, is contained in the containing case, and is capable of cooling the rotating electrical machine and the inverter; and a supplying pipe capable of supplying the cooling mechanism with the coolant circulating in the cooling circuit.

6 Claims, 10 Drawing Sheets

DRIVING APPARATUS AND VEHICLE INCLUDING DRIVING APPARATUS

TECHNICAL FIELD

The present invention relates to a driving apparatus and a vehicle including the driving apparatus.

BACKGROUND ART

Conventionally, there are proposed a wide variety of driving apparatuses each of which is provided in a vehicle, has a motor and an inverter integrated therein, and includes a cooling mechanism capable of cooling the motor and the inverter.

For example, Japanese Patent Laying-Open No. 2005-20881 describes a driving apparatus having a cooling space provided in its portion at which a driving apparatus case containing a motor and a heat sink integrated in an inverter are opposite to each other.

The cooling space is divided by a separating wall into an inverter side cooling space that faces the heat sink, and a driving case side cooling space that faces the driving apparatus case. The driving apparatus includes flow-in amount adjusting means for adjusting a coolant flow-in ratio.

A coolant circulation path, which circulates cooling water as single coolant through the cooling space, includes a water pump, a radiator, and the like. The water pump has a discharge side flow path serving as a starting point of the coolant circulation path and connected to an entrance side port of the heat sink.

In the driving apparatus described in Japanese Patent Laying-Open No. 2005-20881, the port to which the discharge side flow path of the water pump is connected protrudes upward, so the discharge side flow path projects in a space above the driving apparatus. Hence, the conventional driving apparatus suffers from a drawback that when the driving apparatus is mounted in a vehicle and connected to a pipe path of a cooling circuit, the driving apparatus and the cooling circuit occupy a large space, resulting in difficulties in mounting.

DISCLOSURE OF THE INVENTION

The present invention is made in light of the foregoing problem, and its object is to provide a driving apparatus including a cooling circuit for cooling an electronic device such as an inverter and facilitating mounting in a vehicle, and a vehicle including the driving apparatus.

A driving apparatus according to the present invention is a driving apparatus installed in a vehicle, and includes: a rotating electrical machine; an electronic device capable of supplying electric power to the rotating electrical machine; and a containing case capable of containing the electronic device and the rotating electrical machine. The driving apparatus includes: a coolant circuit distributing coolant capable of cooling the electronic device and the rotating electrical machine; and a cooling mechanism, which is provided in the coolant circuit, is contained in the containing case, and is capable of cooling the rotating electrical machine and the electronic device. The driving apparatus further includes a supplying pipe, which is provided at an outer surface of the containing case, extends from its portion connecting with the cooling mechanism toward a front side of the vehicle, is connected to the cooling mechanism, and is capable of supplying the cooling mechanism with the coolant circulating in the coolant circuit.

It is preferable that the supplying pipe be provided at an upper surface of the containing case. It is preferable that the driving apparatus further include a connection pipe connected to the supplying pipe and having an elastic modulus smaller than that of the supplying pipe, and a fixing member provided in the containing case and capable of fixing the connection pipe to the containing case.

It is preferable that the coolant circuit includes an outlet, which is formed on the outer surface of the containing case and allows the coolant in the cooling mechanism to get out therefrom, and the supplying pipe has a thickness thinner than a thickness of the containing case that defines the outlet.

It is preferable that the electronic device be an inverter, and the inverter be located at an upstream side in the cooling mechanism relative to the rotating electrical machine, and the supplying pipe is provided at an upstream side in the cooling mechanism relative to the inverter.

A vehicle according to the present invention includes the above-described driving apparatus.

Note that it is expected at the moment of filing of the present application to combine the above-described configurations appropriately.

In accordance with the driving apparatus and vehicle according to the present invention, an electronic device such as a contained inverter can be cooled and mounting in the vehicle can be facilitated.

BRIEF DESCRIPTION OF THE DRAWINGS

FIG. 12 is a schematic diagram showing a variation of an arrangement of a radiator and the like.

BEST MODES FOR CARRYING OUT THE INVENTION

Referring to FIG. 1 to FIG. 12, a driving apparatus 100 and a vehicle 50 including driving apparatus 100 according to the present embodiment will be described. It should be noted that the same or equivalent configurations are given the same reference characters, and explanation therefor will not be repeated. Note also that when referring to the number, amount, and the like in an embodiment described below, the scope of the present invention is not necessarily limited to the number, amount, and the like unless otherwise noted. Further, in the embodiment described below, each component is not necessarily essential for the present invention unless otherwise noted.

Figure 1:
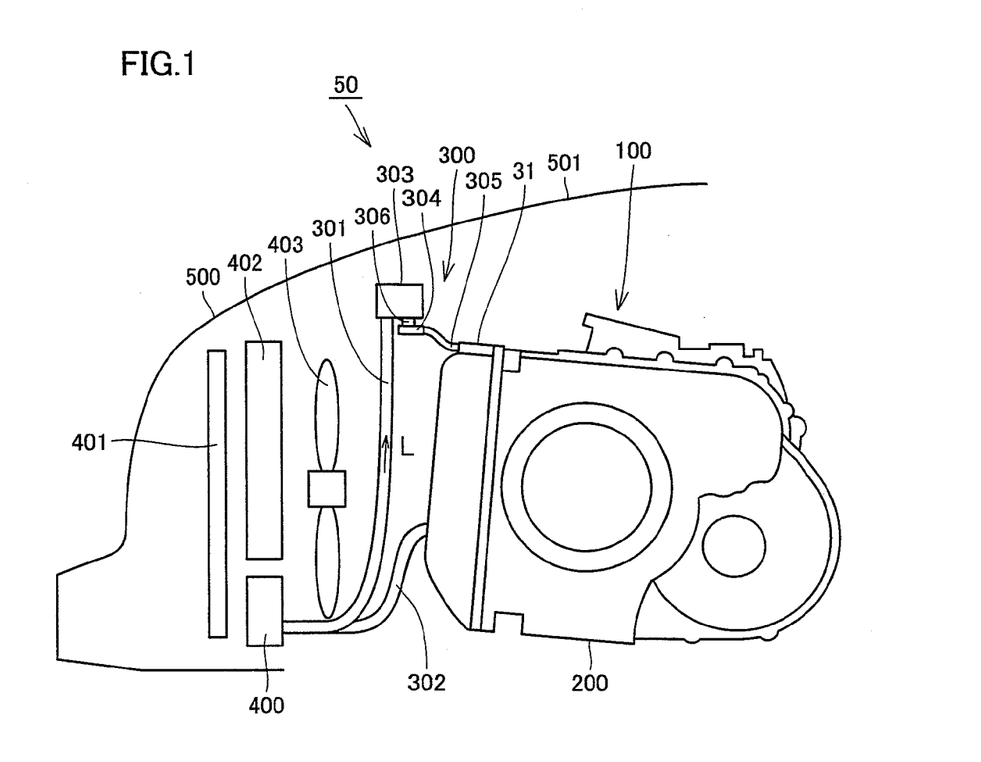
FIG. 1 schematically shows a configuration of a vehicle according to the present embodiment.

FIG. 1 schematically shows a configuration of vehicle 50 according to the present embodiment. As shown in FIG. 1, vehicle 50 includes driving apparatus 100 for driving to rotate a wheel not shown, and a body 500 for containing driving apparatus 100, an engine, and the like. Note that vehicle 50 may be an electric vehicle that drives using motive power from a rotating electrical machine, or may be a hybrid vehicle that drives using motive power from a rotating electrical machine and an engine (internal combustion engine).

In body 500, an engine compartment is defined. Body 500 contains, for example, an engine heat exchanger 402, in which coolant for cooling the engine is distributed, for cooling coolant; and an external heat exchanger 401 of an air conditioner for adjusting a temperature in a cabin in which an occupant resides.

Body 500 includes a hood 501 that is easily deformable to protect a pedestrian or the like when colliding with the pedestrian; and the like. In body 500, driving apparatus 100 is located below hood 501.

Driving apparatus 100 includes a containing case that contains an inverter or the like. Connected to driving apparatus 100 is a cooling circuit (coolant circuit) 300 for cooling an electronic device such as the inverter contained in the containing case.

Cooling circuit 300 includes a cooling mechanism provided in containing case 200, a pump 304 for supplying coolant L to the cooling mechanism, a gas-liquid separator 303 for separating a gas such as air in coolant L supplied to the cooling mechanism, and a radiator (heat exchanger) 400 for cooling coolant L using external air.

To pump 304, which serves as a driving unit for cooling circuit 300, one end of a connection pipe 305 is connected. Connected to the cooling mechanism contained in containing case 200 is a supplying pipe 31. To supplying pipe 31, the other end of connection pipe 305 is connected.

Connected to the cooling mechanism is one end of an outlet pipe 302 allowing the coolant in the cooling mechanism to get out therefrom. To the other end of outlet pipe 302, radiator 400 is connected. Radiator 400 exchanges heat between coolant L heated in the cooling mechanism and external air in order to cool coolant L.

To radiator 400, one end of a connection pipe 301 is connected. The other end of connection pipe 301 is connected to gas-liquid separator 303. Gas-liquid separator 303 is located at a side closer to the front of vehicle 50 relative to driving apparatus 100 and is positioned at the uppermost location in cooling circuit 300.

Gas-liquid separator 303 is capable of separating coolant L supplied from connection pipe 301, and gaseous coolant L and a gas such as air.

Gas-liquid separator 303 has a bottom surface to which one end of a connection pipe 306 is connected. To the other end of connection pipe 306, pump 304 is connected.

Thus, in cooling circuit 300, coolant L discharged from pump 304 is supplied to the cooling mechanism in containing case 200 via connection pipe 305 and supplying pipe 31. Coolant L is heated in the cooling mechanism, is then supplied to radiator 400 via outlet pipe 302, and is cooled therein. Coolant L thus cooled by radiator 400 is supplied to gas-liquid separator 303 via connection pipe 301. In gas-liquid separator 303, air and gaseous coolant L, and liquid coolant L are separated.

Liquid coolant L is supplied to pump 304 via connection pipe 306. In this way, gaseous coolant L and air are prevented from being supplied to pump 304. Accordingly, generation of noise such as cavitation can be suppressed.

In addition, gaseous coolant L, air, and the like can be prevented from being supplied to the cooling mechanism in containing case 200 to secure distribution of coolant L in the cooling mechanism and achieve improved cooling efficiency.

Above radiator 400, engine heat exchanger 402 is disposed to cool the coolant for cooling the engine. At the side closer to the front of vehicle 50 relative to radiator 400 and engine heat exchanger 402, external heat exchanger 401 is provided for the air conditioner for adjusting the temperature in the cabin in which an occupant resides.

At a backward side of vehicle 50 relative to radiator 400 and engine heat exchanger 402, a fan 403 is provided to actively draw external air thereinto. This allows radiator 400 to cool coolant L well.

Figure 2:
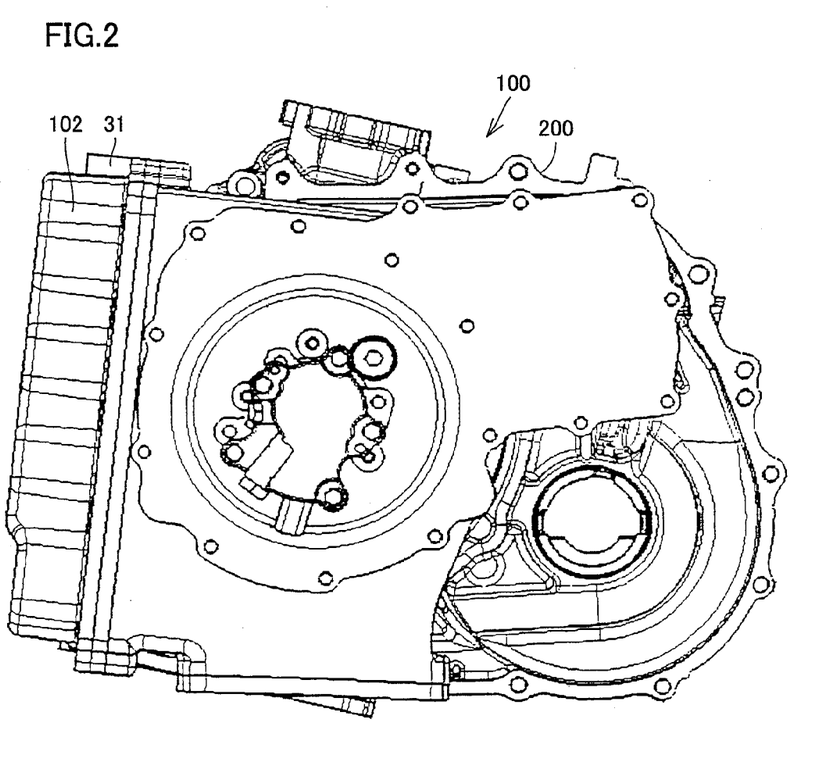
FIG. 2 is a front view of a driving apparatus.
Figure 3:
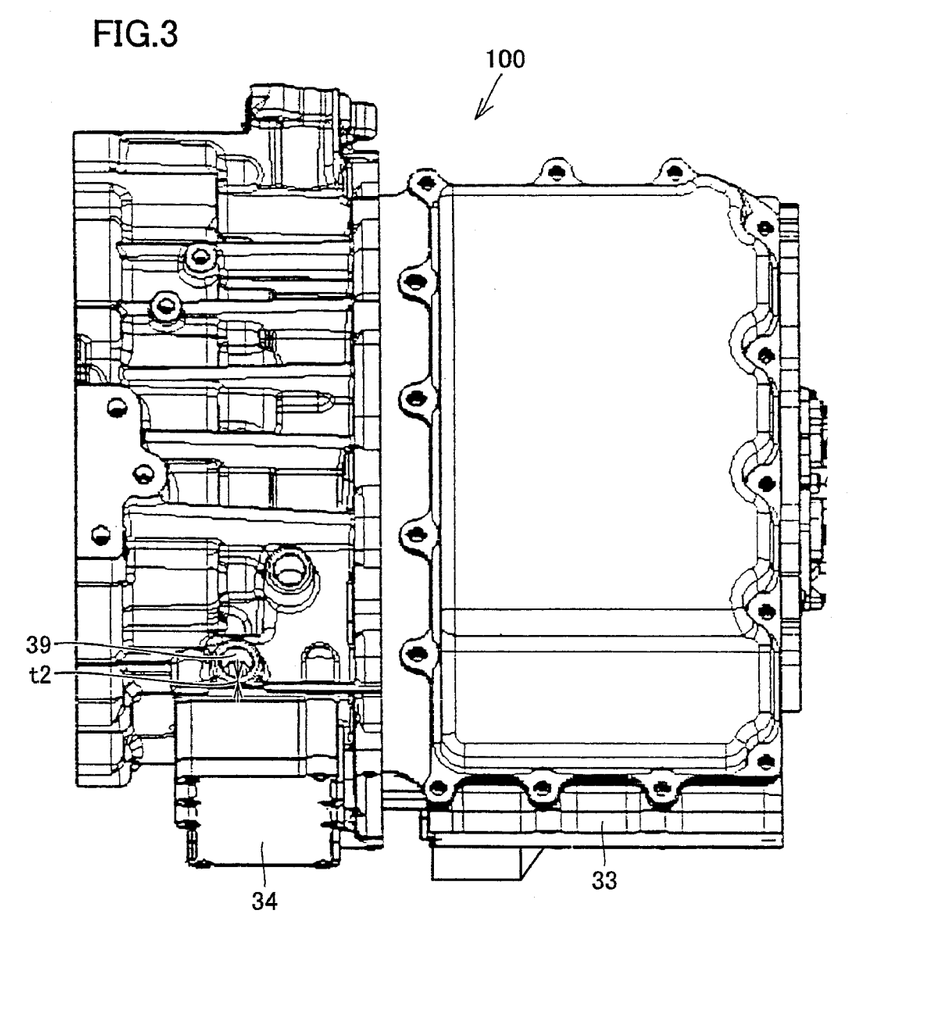
FIG. 3 is a side view of the driving apparatus.
Figure 4:
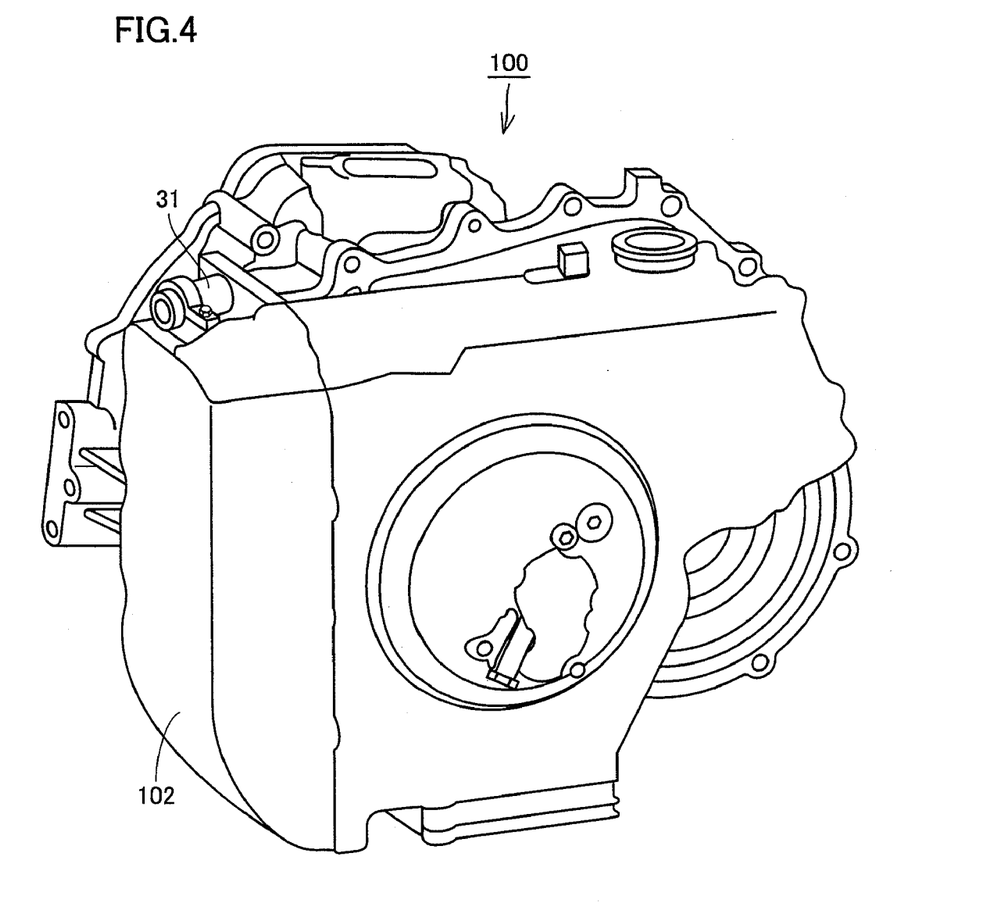
FIG. 4 is a perspective view of the driving apparatus.
Figure 5:
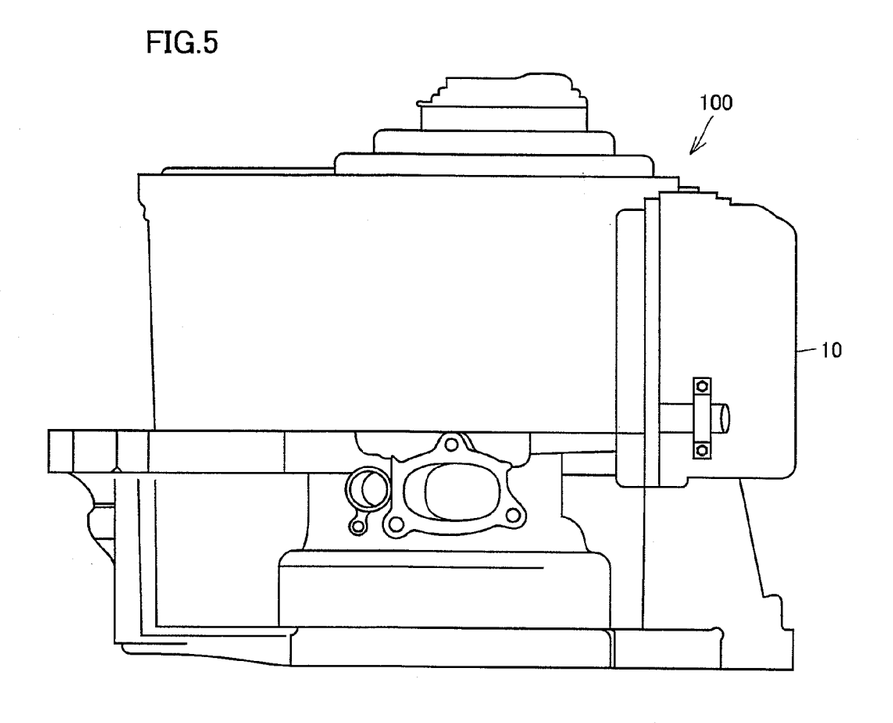
FIG. 5 is a plan view of the driving apparatus.

FIG. 2 is a front view of driving apparatus 100. FIG. 3 is a side view of driving apparatus 100. FIG. 4 is a perspective view of driving apparatus 100. FIG. 5 is a plan view of driving apparatus 100.

As shown in FIG. 2 to FIG. 5, driving apparatus 100 includes containing case 200 that contains an inverter, a capacitor, and a rotating electrical machine. It should be noted that the rotating electrical machine can exhibit at least one of a function as a motor and a function as an electric power generator, and has a function as a motor generator.

Containing case 200 is provided with an inverter cover 102 on its circumferential surface at a portion located at the side closer to the front side of vehicle 50 in order to protect the inverter.

Figure 6:
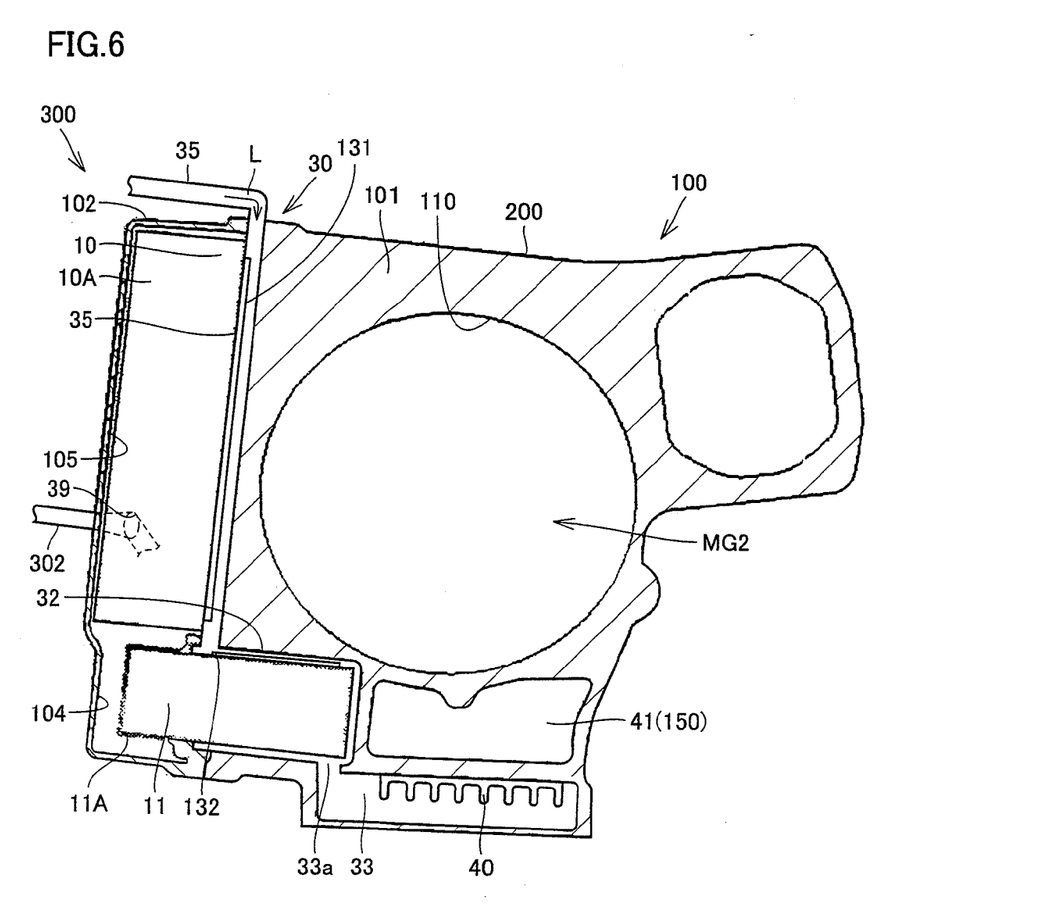
FIG. 6 is a cross sectional view of the driving apparatus.
Figure 7:
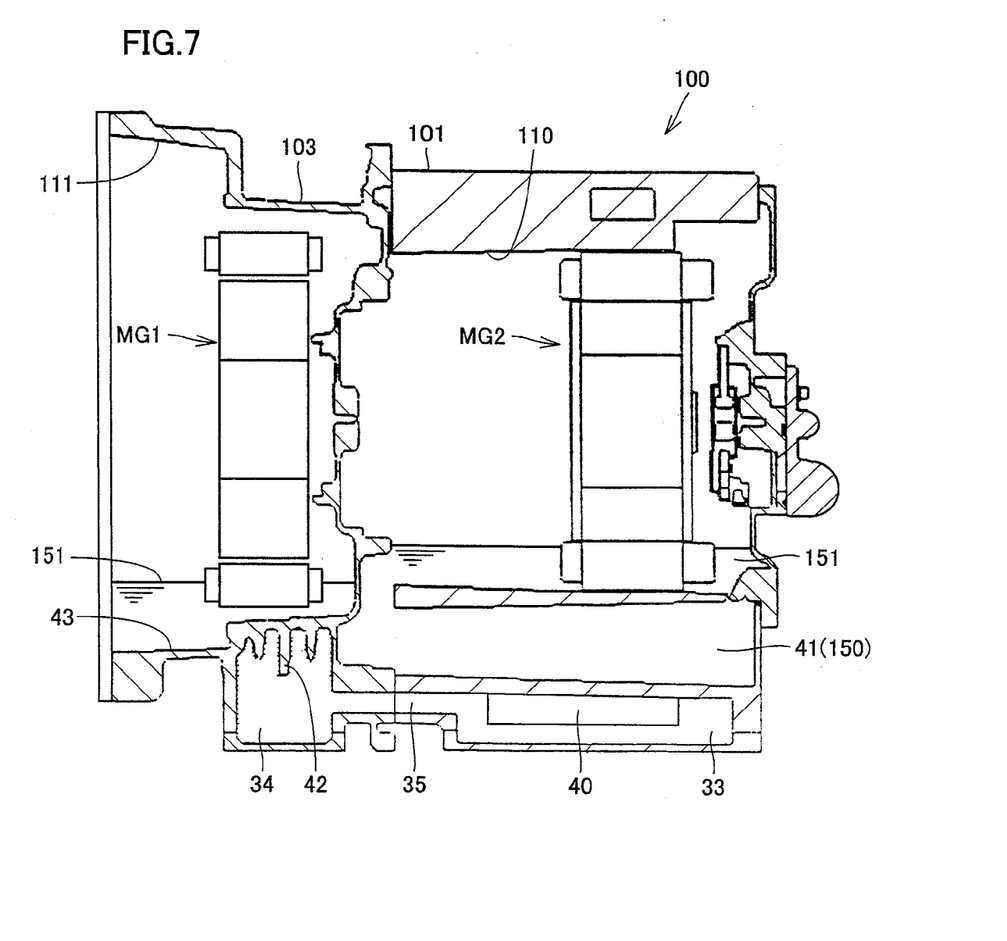
FIG. 7 is a side cross sectional view of the driving apparatus.

FIG. 6 is a cross sectional view of driving apparatus 100. FIG. 7 is a side cross sectional view of driving apparatus 100.

As shown in FIG. 6 and FIG. 7, driving apparatus 100 includes a rotating electrical machine MG2 capable of generating motive power to drive a wheel of a vehicle, a rotating electrical machine MG1 capable of generating electric power when being driven by motive power given from the internal combustion engine not shown in the figures, an inverter 10, a capacitor 11, containing case 200, and cooling mechanism 30, provided in containing case 200, for cooling inverter 10 and rotating electrical machines MG1, MG2.

Inverter 10 includes a plurality of IGBTs (Insulated Gate Bipolar Transistors), and a control board having an electronic component mounted thereon to control turning on/off (conduction/interruption) of the gate of each of the IGBTs (neither of them is shown in the figures). In response to a signal from a control apparatus not shown in the figures, inverter 10 is driven to convert direct current power, supplied from a battery (not shown), into alternating current power and supplies it to rotating electrical machine MG2. When rotating electrical machines MG1, MG2 perform a regenerative operation, inverter 10 converts alternating current power generated by rotating electrical machines MG1, MG2 into direct current power in order to charge the battery.

Capacitor 11 is connected to the battery (not shown) and inverter 10, smoothes electric power from the battery and supplies it to inverter 10, and smoothes electric power and supplies it to the battery. This restrains occurrence of inrush current to inverter 10.

As shown in FIG. 6 and FIG. 7, containing case 200 includes a first containing case 101 containing rotating electrical machine MG2, a second containing case 103 containing rotating electrical machine MG1, and an inverter cover 102 containing inverter 10 and capacitor 11 connected to inverter 10.

It should be noted that, in the present embodiment, containing case 200 contains rotating electrical machines MG1, MG2, inverter 10, and capacitor 11, but the present invention is not limited to this. For example, instead of capacitor 11, a reactor connected to inverter 10 may be contained therein, or both capacitor 11 and the reactor may be contained. In addition, a converter may be contained.

Here, rotating electrical machines MG1, MG2 have their rotating shafts positioned coaxially. Along the extensions of the rotating shafts, first containing case 101 and second containing case 103 are arranged. The rotating shafts of rotating electrical machines MG1, MG2 extend in the width direction of vehicle 50 shown in FIG. 1.

First containing case 101 defines a rotating electrical machine containing portion 110 capable of containing rotating electrical machine MG2; a coolant reservoir 41; and a jacket portion 33.

Inverter cover 102 is attached to a side surface of first containing case 101. Inverter cover 102 thus attached to the side surface of first containing case 101 defines therein an inverter receiving portion (inverter containing portion) 105 that receives inverter 10, and a capacitor receiving portion (capacitor receiving portion) 104 capable of receiving capacitor 11.

Inverter 10 is contained in an inverter cover 10A. Inverter cover 10A is contained in inverter receiving portion 105. Note that if the converter is also contained in containing case 200, it is preferable to contain the converter in inverter receiving portion 105.

Capacitor 11 is contained in a capacitor case 11A. Capacitor case 11A is contained in capacitor receiving portion 104.

Here, each of inverter cover 10A and capacitor case 11A is provided around first containing case 101. Specifically, inverter cover 10A is positioned lateral to rotating electrical machine containing portion 110 of first containing case 101, whereas capacitor case 11A is positioned obliquely downward relative to rotating electrical machine containing portion 110.

Accordingly, inverter 10 is positioned above capacitor 11 and lateral to rotating electrical machine containing portion 110. Inverter 10 and capacitor 11 are arranged around rotating electrical machine MG2 along the inner circumferential surface of first containing case 101 that defines rotating electrical machine containing portion 110.

Thus, inverter 10 and capacitor 11 are arranged not to overlap with each other in the surroundings of rotating electrical machine MG2. Hence, the width of the case can be prevented from being large. Accordingly, the size of containing case 200 can be compact.

Second containing case 103 defines a rotating electrical machine containing portion 111 containing rotating electrical machine MG1; and a jacket portion 34.

Driving apparatus 100 further includes a coolant circulation circuit (first coolant circulation circuit) 150 for cooling rotating electrical machine MG1 and rotating electrical machine MG2.

In coolant circulation circuit 150, insulative lubricating oil 151 is distributed. Lubricating oil 151 is sprayed to rotating electrical machines MG1, MG2 to cool them and is supplied to bearings of the rotating shafts of rotating electrical machines MG1, MG2 to secure lubricity of the bearings.

Lubricating oil 151 sprayed to rotating electrical machine MG2 and supplied to the bearing of rotating electrical machine MG2 is then accumulated in coolant reservoir 41 formed within second containing case 103. On the other hand, lubricating oil 151 sprayed to rotating electrical machine MG1 and supplied to the bearing of rotating electrical machine MG1 is then accumulated in the bottom portion of first containing case 103. Thus, lubricating oil 151 supplied to rotating electrical machines MG1, MG2 is brought back to an oil pan (not shown), is then sucked up by an oil pump or the like, is supplied to rotating electrical machines MG1, MG2, and the like through a strainer, and goes back to the oil pan again.

Cooling mechanism 30 includes a pipe path 35 extending between the side surface of first containing case 101 lateral to rotating electrical machine containing portion 110 and the side surface of inverter cover 10A. Accordingly, coolant L flowing in pipe path 35 can absorb heat from inverter 10 to cool it.

In addition, pipe path 35 thus provided between rotating electrical machine MG2 and inverter 10 can prevent transfer of heat generated by driving of rotating electrical machine MG2 to inverter 10.

Here, pipe path 35 has a portion in contact with or adjacent to the side surface of inverter cover 10A. In this portion, a plurality of fins (inverter heat dissipating units) 131, each extending in the direction in which pipe path 35 extends, are provided. Accordingly, a larger contact area with coolant L is obtained therein, allowing heat to be dissipated well from inverter 10 to coolant L via fins 131.

Connected to pipe path 35 is a connection pipe 301 connected to radiator 400. Coolant L cooled by radiator 400 is supplied thereto via an opening 30a located at the upper end of pipe path 35. Hence, coolant L not heated by other devices such as capacitor 11 can be supplied for inverter 10 and cool it well.

In addition, since pipe path 35 extends from the upper surface side to the lower surface side of containing case 200, gas having entered pipe path 35, such as air or water vapor, will be moved toward the upper end of pipe path 35.

This can prevent accumulation of air in pipe path 35 at a portion opposite to inverter 10, thereby cooling inverter 10 well.

It is preferable that the width of pipe path 35 (the width in the direction in which the rotating shaft of rotating electrical machine MG2 extends) and the width of inverter 10 match with each other. Pipe path 35 thus formed can prevent transfer of heat from rotating electrical machine MG2 to inverter 10 and achieve improved efficiency for cooling inverter 10.

Cooling mechanism 30 includes a pipe path 32 that is connected to the lower end of pipe path 35 extending from the upper side to the lower side of containing case 200 and that is provided around capacitor 11.

Pipe path 32 extends from the upper surface of capacitor case 11A to the bottom surface of capacitor case 11A via the side surface thereof opposite to first containing case 101.

In this way, pipe path 32 extends to surround the circumference of capacitor case 11A, whereby capacitor 11 can be cooled well.

Further, because pipe path 32 is provided between rotating electrical machine MG2 and capacitor 11, heat from rotating electrical machine MG2 can be prevented from being transferred to capacitor 11.

Furthermore, pipe path 32 is inclined downward at its portion over the upper surface of capacitor 11, more specifically, is inclined downward from its portion connected to pipe path 35 to its downstream side in the direction in which coolant L is distributed. Also, pipe path 32 extends generally vertically at its portion located at the side surface of capacitor 11. Accordingly, gas having entered pipe path 32, such as air or water vapor, is let out to pipe path 35.

In this way, the gas is prevented from remaining in pipe path 32 and pipe path 32 can be therefore filled with coolant L. Hence, capacitor 11 can be cooled well.

Here, capacitor 11 is positioned lateral to coolant reservoir 41 storing the lubricating oil. Pipe path 32 also has a portion located between capacitor 11 and coolant reservoir 41. Hence, heat from coolant reservoir 41 can be prevented from being transferred to capacitor 11.

Note that a plurality of fins (capacitor heat dissipating units) 132 each extending in the direction in which pipe path 32 extends may be provided on the inner surface of pipe path 32 at a portion adjacent to capacitor case 11A in order to achieve improved cooling efficiency.

Further, the width direction of pipe path 32 (direction perpendicular to the plane of FIG. 2; direction in which the rotating shaft of rotating electrical machine MG2 extends) and the width of capacitor 11 may match with each other. Pipe path 32 thus formed can more efficiently prevent heat transfer from rotating electrical machine MG2 and coolant reservoir 41 to capacitor 11, thereby cooling capacitor 11 more efficiently.

Furthermore, cooling mechanism 30 includes jacket portion 33 connected to pipe path 32. Jacket portion 33, provided below coolant reservoir 41, extends in the axial direction of the rotating shaft of rotating electrical machine MG2 as shown in FIG. 6. At jacket portion 33, heat is exchanged between coolant L therein and lubricating oil 151 in coolant reservoir 41. Thus, lubricating oil 151 can be cooled.

In particular, a plurality of fins (lubricating oil heat dissipating units) 40 each extending in the direction in which jacket portion 33 extends are provided on the inner surface of jacket portion 33 at a portion opposite to coolant reservoir 41. Hence, lubricating oil 151 can be cooled well.

Here, as shown in FIG. 6 and FIG. 7, coolant reservoir 41, provided below rotating electrical machine MG2, extends in the axial direction of the rotating shaft of rotating electrical machine MG2, and therefore extends in the same direction as the direction in which jacket portion 33 extends.

Hence, jacket portion 33 and coolant reservoir 41 face each other at a large area, thus securing an area allowing for heat exchange between lubricating oil 151 and coolant L. Lubricating oil 151 can be therefore cooled well.

Further, cooling mechanism 30 includes jacket portion 34 that is provided in the downstream side relative to jacket portion 33 in the direction in which the coolant is distributed and that is connected to jacket portion 33.

Jacket portion 34 is provided below rotating electrical machine containing portion 111 containing rotating electrical machine MG1. Rotating electrical machine containing portion 111 has a generally cylindrical shape. Jacket portion 34 extends along the inner circumferential surface of second containing case 103 that defines rotating electrical machine containing portion 111.

At the bottom surface of rotating electrical machine containing portion 111, the lubricating oil sprayed to rotating electrical machine MG1 and supplied to the bearing of rotating electrical machine MG1 is accumulated. Since jacket portion 34 is provided adjacent to the bottom surface of rotating electrical machine containing portion 111, the lubricating oil in rotating electrical machine containing portion 111 can be cooled.

Further, a fin 42 extending in the direction in which jacket portion 34 extends is provided on the inner surface of jacket portion 34 at a portion adjacent to rotating electrical machine containing portion 111. Accordingly, the lubricating oil can be cooled well.

Coolant L is brought back from an outlet 39 shown in FIG. 3 into radiator 400 via outlet pipe 302.

As described above, in driving apparatus 100 according to the present embodiment, inverter 10, which has a heat-resistant temperature lower than that of capacitor 11, is first cooled, and capacitor 11 and rotating electrical machines MG1, MG2 are cooled thereafter. This can restrain deterioration of inverter 10, which has a heat-resistant temperature lower than those of rotating electrical machines MG1, MG2.

Further, capacitor 11 is cooled before cooling of lubricating oil 151. This prevents rising of temperature of coolant L for cooling capacitor 11, whereby capacitor 11 can be cooled well too.

Figure 8:
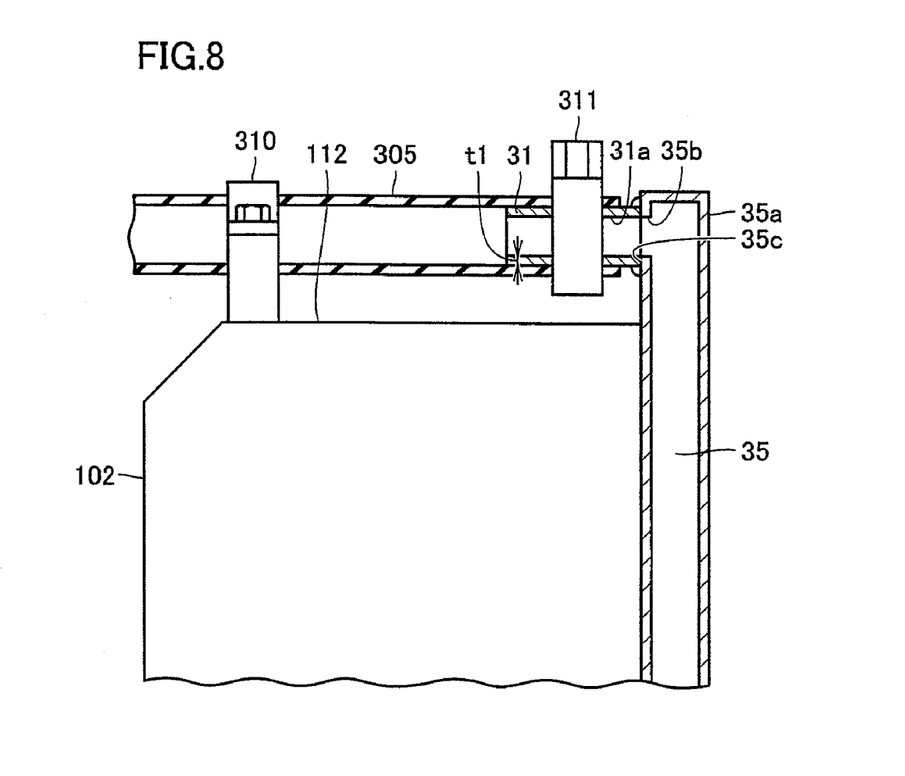
FIG. 8 is a side view of a supplying pipe connected to a pipe path of a cooling mechanism and a configuration at its proximity, and shows a portion thereof in cross section.

FIG. 8 is a side view of supplying pipe 31 connected to pipe path 35 of cooling mechanism 30 and a configuration in its proximity, and shows a portion thereof in cross section. In the example shown in FIG. 8, pipe path 35 has a portion including a protruding portion 35a that protrudes higher than the height of the upper surface of inverter cover 102.

Protruding portion 35a has an opening 35b formed at its circumferential surface, namely, at its side surface located at the side closer to the front of vehicle 50 shown in FIG. 1. Supplying pipe 31 is connected to a connecting portion 35c located on a wall surface defining opening 35b in the surroundings of opening 35b. Supplying pipe 31 has a through hole 31a communicating with opening 35b. Supplying pipe 31 extends from connecting portion 35c toward the front side of vehicle 50 shown in FIG. 1 along upper surface 112 of inverter cover 102. Here, in upper surface 112 of inverter cover 102, a portion located at the side closer to the front of vehicle 50 relative to protruding portion 35a has a generally flat surface shape, and extends in the horizontal direction. Hence, supplying pipe 31, provided over the upper surface 112 of inverter cover 102, can be arranged to extend in the horizontal direction.

Since supplying pipe 31 extends along upper surface 112 as such, a foreign matter such as dust can be prevented from entering via the opening of supplying pipe 31 in a process of positioning driving apparatus 100 in the engine compartment with upper surface 112 facing in the horizontal direction, and thereafter connecting connection pipe 305 thereto.

Supplying pipe 31 is fit into connection pipe 305. Connection pipe 305 also extends along upper surface 112 of inverter cover 102. As such, both connection pipe 305 and supplying pipe 31 extend along upper surface 112 of inverter cover 102. Accordingly, even when connecting connection pipe 305 via supplying pipe 31 to driving apparatus 100 contained in the engine compartment, a space occupied by driving apparatus 100 and connection pipe 305 can be reduced in the engine compartment. Specifically, both supplying pipe 31 and connection pipe 305 are provided at a location over and proximate to upper surface 112 of inverter cover 102, whereby supplying pipe 31 and connection pipe 305 can be prevented from projecting from the outer surface of containing case 200.

Hence, in the surroundings of driving apparatus 100, a space can be secured to contain other devices, thus achieving improved mounting efficiency in the engine compartment.

Particularly, in FIG. 1, connection pipe 305 and supplying pipe 31 can be prevented from projecting upward from the upper surface of driving apparatus 100, whereby a space with a predetermined size can be secured between hood 501 located above driving apparatus 100 and driving apparatus 100.

This can secure an area in which hood 501 can be deformed when vehicle 50 collides with an object and the collided object accordingly hits against hood 501, thus preventing damage on the collided object.

In other words, when an object collides with hood 501 to deform hood 501, connection pipe 305 and supplying pipe 31 can be prevented from colliding with hood 501. Further, since supplying pipe 31 and connection pipe 305 are spaced away from hood 501, connection pipe 305 and supplying pipe 31 can be prevented from making contact with hood 501 due to vibrations generated during traveling of the vehicle. In addition, not only driving apparatus 100 is contained in the engine compartment as described above, but also, for example, the area occupied by driving apparatus 100 provided with supplying pipe 31 is reduced. Hence, efficiency in carrying driving apparatus 100 can be improved.

Note that supplying pipe 31 and connection pipe 305 into which supplying pipe 31 is fit with its outer circumference are firmly connected to each other by a clip 311.

To connection pipe 305, a fixing member 310 is attached at a portion located away from clip 311 toward the front side of vehicle 50.

Fixing member 310 is provided on upper surface 112 of inverter cover 102 to fixate connection pipe 305 to inverter cover 102. Hence, a portion between fixing member 310 and clip 311 in connection pipe 305 can be prevented from vibrating.

Specifically, even when a portion of connection pipe 305 opposite to supplying pipe 31 relative to fixing member 310 vibrates, the vibration can be prevented from being transferred to the portion between fixing member 310 and clip 311 in connection pipe 305.

In addition, the portion between fixing member 310 and clip 311 in connection pipe 305 is short in length and is therefore less likely to vibrate.

Thus, fixing member 310 can maintain connection pipe 305 along upper surface 112 of inverter cover 102, thus preventing increase of the space occupied by driving apparatus 100, supplying pipe 31, and connection pipe 305 in the engine compartment.

Particularly, fixing member 310 is provided on upper surface 112 at its peripheral edge located at the side closer to the front of vehicle 50. Hence, on the upper surface of inverter cover 102, connection pipe 305 can be prevented from vibrating and a space can be secured between driving apparatus 100 and hood 501 shown in FIG. 1.

Figure 9:
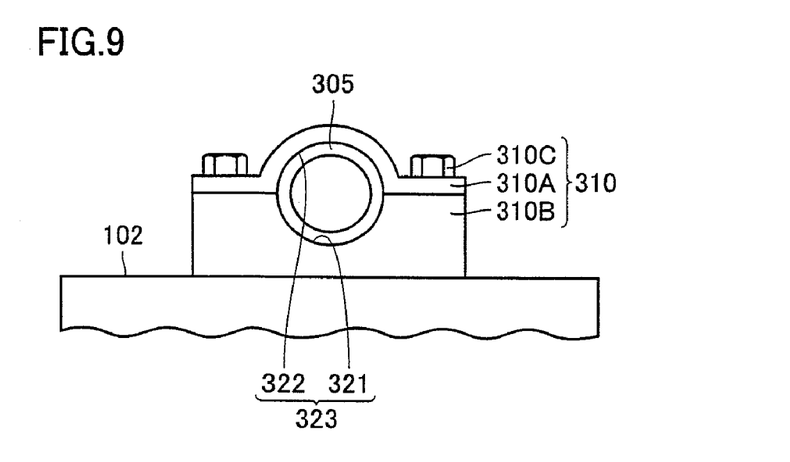
FIG. 9 is a front view of a fixing member.

FIG. 9 is a front view of fixing member 310. As shown in FIG. 9, fixing member 310 includes a base 310B fixed to the upper surface of inverter cover 102, a retaining member 310A provided on the upper surface of base 310B, and a bolt (fastening member) 310C fixing retaining member 310A to base 310B.

On the upper surface of base 310B, a groove portion 321 capable of receiving at least a portion of connection pipe 305 is formed. Also on the lower surface of retaining member 310A, a groove portion 322 capable of receiving at least a portion of connection pipe 305 is formed. Onto the upper surface of base 310B, retaining member 310A is attached to define a through hole 323 in which groove portion 322 and groove portion 321 hold connection pipe 305 therebetween.

In this way, connection pipe 305 can be sandwiched by fixing member 310 to prevent vibration of connection pipe 305 positioned between fixing member 310 and supplying pipe 31.

Here, supplying pipe 31 is formed from, for example, a metallic material such as copper, stainless steel, or the like, whereas connection pipe 305 is formed from, for example, rubber or the like. Accordingly, with a small stress imposed, connection pipe 305 is elastically deformable greater than the deformation of supplying pipe 31. In other words, connection pipe 305 is made of a material having an elastic modulus smaller than that of supplying pipe 31.

Hence, even when the portion opposite to clip 311 and supplying pipe 31 with respect to fixing member 310 vibrates in connection pipe 305, connection pipe 305 is elastically deformed at the portion corresponding to fixing member 310, thus preventing damage on connection pipe 305.

Thus, in connection pipe 305, the portion connected to supplying pipe 31 is less likely to vibrate, so stress transferred from connection pipe 305 to supplying pipe 31 can be reduced. Accordingly, the rigidity of supplying pipe 31 does not need to be high and supplying pipe 31 can have a thin thickness t1.

Thickness t1 of supplying pipe 31 is thinner than a thickness t2 of walls of containing case 200 that define outlet 39 shown in FIG. 3. In this way, the size of supplying pipe 31 in the height direction of vehicle 50 can be reduced.

Further, external force applied to supplying pipe 31 is reduced, so the thickness of a wall surface of the pipe path defining protruding portion 35a can be thin. This achieves improved capacity in inverter cover 102. It should be noted that since the force applied to pipe path 35 can be reduced, for example, the root of pipe path 35 can be prevented from being subjected to a great force to prevent pipe path 35 from dropping off. Note also that connecting portion 35c for supplying pipe 31 and pipe path 35 is located slightly above upper surface 112 of inverter cover 102 to define a workspace for connecting supplying pipe 31 thereto by means of welding.

Figure 10:
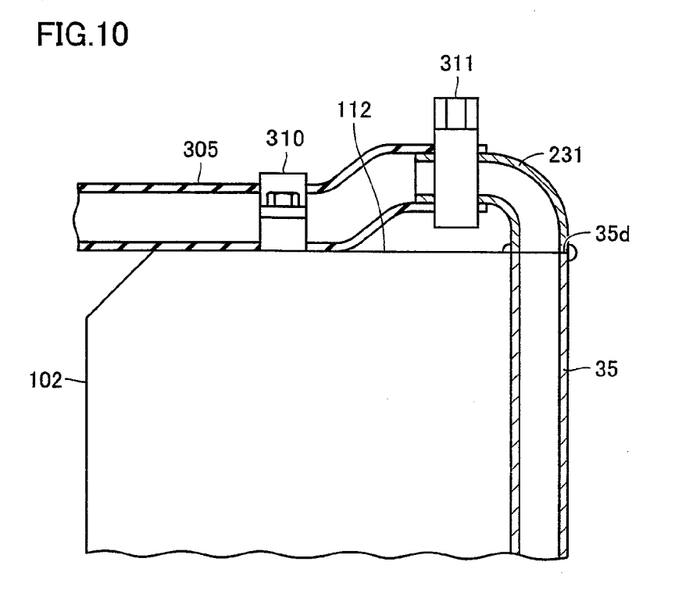
FIG. 10 is a side cross sectional view of a variation of the supplying pipe, and shows a portion thereof in cross section.

FIG. 10 is a side cross sectional view showing a variation of the supplying pipe, a portion of which is illustrated in cross section. As shown in FIG. 10, pipe path 35 has an opening 35d provided at a location generally coinciding with upper surface 112 of inverter cover 102.

Further, supplying pipe 231 is connected to the wall surface of pipe path 35 that defines opening 35d. Hence, the through hole of supplying pipe 231 communicates with opening 35d. Supplying pipe 231 has an end connected to connection pipe 305. Connection pipe 305 is brought into contact with and fixed to upper surface 112 of inverter cover 102 by fixing member 310. This prevents connection pipe 305 from projecting upward from upper surface 112.

Figure 11:
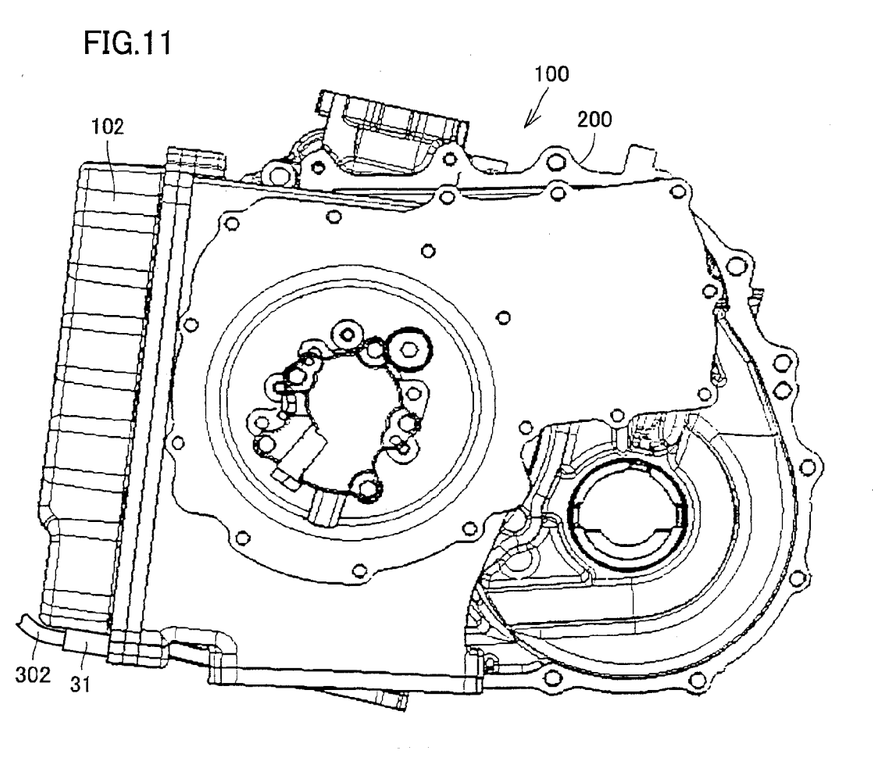
FIG. 11 is a front view showing that the supplying pipe is provided on the lower surface side of an inverter cover.

Note that the present invention is not limited to a case where supplying pipe 31 is positioned over the upper surface of inverter cover 102. FIG. 11 is a front view showing that supplying pipe 31 is provided on the lower surface side of inverter cover 102. As shown in FIG. 11, when supplying pipe 31 is provided on the lower surface side of inverter cover 102, supplying pipe 31 and connection pipe 305 connected thereto can be prevented from projecting downward from the lower surface of inverter cover 102, too.

Thus, even when driving apparatus 100 is provided at a lower portion in the engine compartment, connection pipe 305 and supplying pipe 31 can be prevented from contacting other devices. This allows driving apparatus 100 and the hood to be spaced away from each other.

Figure 12:
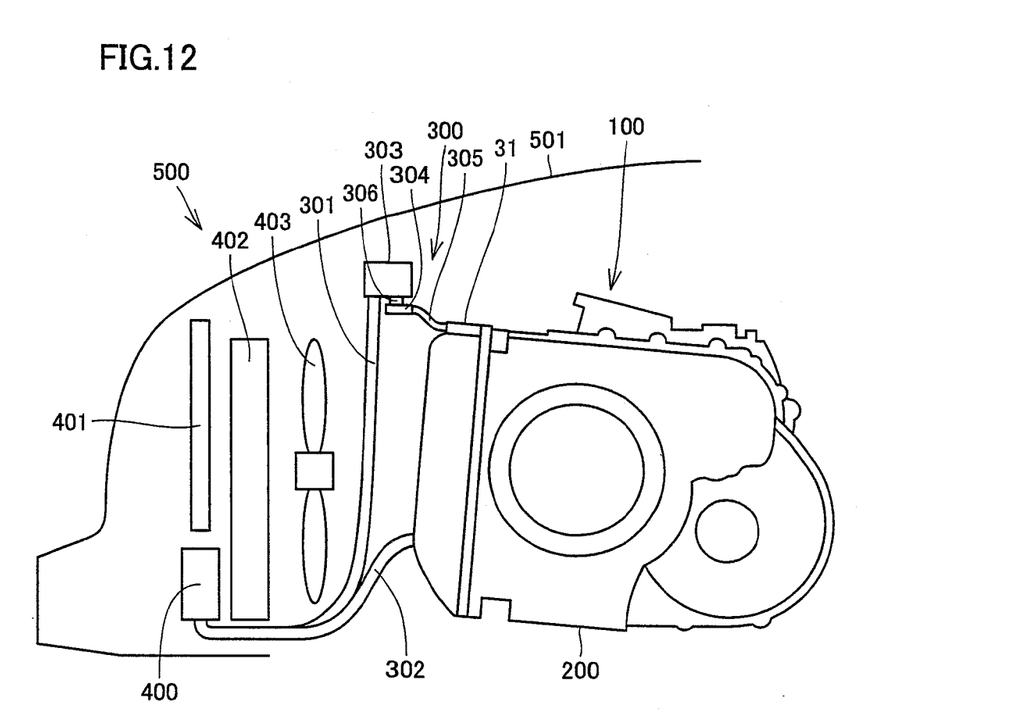

Furthermore, FIG. 12 is a schematic diagram showing a variation of an arrangement of radiator 400 and the like. As shown in FIG. 12, radiator 400 may be provided in a location at the side closer to the front of vehicle 50 relative to engine heat exchanger 402. By positioning radiator 400 in such a location, coolant L distributing in radiator 400 can be cooled well. Although the embodiment of the present invention has been described as above, the embodiment disclosed herein is illustrative and non-restrictive in any respect. The scope of the present invention is defined by the scope of claims, and is intended to include any modifications within the scope and meaning equivalent to the terms of the claims.

INDUSTRIAL APPLICABILITY

The present invention is suitable for a driving apparatus and a vehicle including the driving apparatus.

The invention claimed is:

1. A driving apparatus installed in a vehicle, comprising:
a rotating electrical machine;
an electronic device capable of supplying electric power to said rotating electrical machine;

a containing case capable of containing said electronic device and said rotating electrical machine;

a coolant circuit distributing coolant capable of cooling said electronic device and said rotating electrical machine;

a cooling mechanism, which is provided in said coolant circuit, is contained in said containing case, and is capable of cooling said rotating electrical machine and said electronic device; and a supplying pipe, which is connected to said cooling mechanism, and is capable of supplying said cooling mechanism with said coolant circulating in said coolant circuit, a connecting portion for said cooling mechanism and said supplying pipe being provided at an outer surface of said containing case, said supplying pipe extending from said connecting portion toward a front side of said vehicle, said electronic device being positioned lateral to said rotating electrical machine, said coolant circuit having a pipe path extending between said rotating electrical machine and said electronic device and extending from an upper surface side to a lower surface side of said containing case.

2. The driving apparatus according to claim 1, wherein said supplying pipe is provided at an upper surface of said containing case.

3. The driving apparatus according to claim 1, wherein:
said electronic device is an inverter, and
said inverter is located at an upstream side in said cooling mechanism relative to said rotating electrical machine, and said supplying pipe is provided at an upstream side in said cooling mechanism relative to said inverter.

4. A vehicle comprising the driving apparatus according to claim 1.

5. A driving apparatus installed in a vehicle, comprising:
a rotating electrical machine;
an electronic device capable of supplying electric power to said rotating electrical machine;
a containing case capable of containing said electronic device and said rotating electrical machine;
a coolant circuit distributing coolant capable of cooling said electronic device and said rotating electrical machine;
a cooling mechanism, which is provided in said coolant circuit, is contained in said containing case, and is capable of cooling said rotating electrical machine and said electronic device; and
a supplying pipe, which is provided at an outer surface of said containing case, extends from a connecting portion for said cooling mechanism and said supplying pipe toward a front side of said vehicle, is connected to said cooling mechanism, and is capable of supplying said cooling mechanism with said coolant circulating in said coolant circuit,
said driving apparatus further comprising a connection pipe connected to said supplying pipe and having an elastic modulus smaller than that of said supplying pipe, and a fixing member provided in said containing case and capable of fixing said connection pipe to said containing case.

6. A driving apparatus installed in a vehicle, comprising:
a rotating electrical machine;
an electronic device capable of supplying electric power to said rotating electrical machine;
a containing case capable of containing said electronic device and said rotating electrical machine;
a coolant circuit distributing coolant capable of cooling said electronic device and said rotating electrical machine;
a cooling mechanism, which is provided in said coolant circuit, is contained in said containing case, and is capable of cooling said rotating electrical machine and said electronic device; and
a supplying pipe, which is provided at an outer surface of said containing case, extends from a connecting portion for said cooling mechanism and said supplying pipe toward a front side of said vehicle, is connected to said cooling mechanism, and is capable of supplying said cooling mechanism with said coolant circulating in said coolant circuit,
said coolant circuit including an outlet, which is formed at the outer surface of said containing case and allows said coolant in said cooling mechanism to get out therefrom,
said supplying pipe having a thickness smaller than a thickness of said containing case that defines said outlet.

* * * * *